(12) United States Patent
Danielian

(10) Patent No.: US 8,413,535 B2
(45) Date of Patent: Apr. 9, 2013

(54) MANUAL TRANSMISSION SHIFTER ADJUSTMENT TOOL

(75) Inventor: Michael C. Danielian, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 577 days.

(21) Appl. No.: 12/408,268

(22) Filed: Mar. 20, 2009

(65) Prior Publication Data
US 2010/0236349 A1    Sep. 23, 2010

(51) Int. Cl.
*G05G 5/00*    (2006.01)
(52) U.S. Cl. .................................. 74/473.25; 70/247
(58) Field of Classification Search ............... 74/473.18, 74/473.19, 473.21–473.26, 473.36, 473.1; 70/201, 202, 203, 245, 247, 198, 200, 192, 70/206
See application file for complete search history.

(56) References Cited

U.S. PATENT DOCUMENTS

| | | | | |
|---|---|---|---|---|
| 1,388,035 A | * | 8/1921 | Gorden | 70/201 |
| 1,453,004 A | * | 4/1923 | Collion | 70/203 |
| 3,508,424 A | * | 4/1970 | Eisenman | 70/202 |
| 4,371,063 A | * | 2/1983 | Troemner et al. | 192/219.6 |
| 4,835,999 A | * | 6/1989 | Chant | 70/238 |
| 4,936,120 A | * | 6/1990 | Fiks | 70/202 |
| 4,972,693 A | * | 11/1990 | Inouye | 70/238 |
| 4,993,248 A | * | 2/1991 | Nordberg | 70/247 |
| 4,995,250 A | * | 2/1991 | Chiou | 70/238 |
| 5,038,667 A | * | 8/1991 | Slater | 70/199 |
| 5,141,119 A | * | 8/1992 | Milazzo | 212/290 |
| 5,473,918 A | * | 12/1995 | Hixon | 70/202 |
| 5,551,265 A | * | 9/1996 | Garman et al. | 70/177 |
| 5,689,982 A | * | 11/1997 | Chang | 70/247 |
| 5,890,383 A | * | 4/1999 | Chang | 70/247 |
| 5,911,391 A | * | 6/1999 | Russ et al. | 244/224 |
| 5,950,464 A | * | 9/1999 | Tonne | 70/247 |
| 6,003,350 A | * | 12/1999 | Sentner, Jr. | 70/202 |
| 6,082,214 A | * | 7/2000 | Paparoni | 74/473.22 |
| 6,101,854 A | * | 8/2000 | Chang | 70/202 |
| 6,176,809 B1 | * | 1/2001 | Visser et al. | 477/99 |
| 6,382,000 B1 | * | 5/2002 | Horton | 70/163 |

* cited by examiner

*Primary Examiner* — Michael P Ferguson
*Assistant Examiner* — Daniel Wiley

(57) ABSTRACT

A tool adapted to prevent a shifter shaft from moving relative to a shifter housing includes an elongated member having a first side, a second side substantially opposite the first side, and a third side disposed between the first and second sides, wherein the elongated member is disposed at least partially parallel to the shifter shaft and is adapted to be secured to the shifter housing. A first side member is disposed on the first side of the elongated member, a second side member is disposed on the second side of the elongated member, and a collar is disposed on the third side of the elongated member, wherein the collar is adapted to secure to the shifter shaft. The first side member and second side member prevent the shifter shaft from moving in a first direction and the elongated member prevents the shifter shaft from moving in a second direction.

13 Claims, 5 Drawing Sheets

MANUAL TRANSMISSION SHIFTER ADJUSTMENT TOOL

FIELD

The present disclosure relates to a tool that attaches to a shifter in a manual transmission, and more particularly to a tool that attaches to a shifter in a manual transmission that prevents the shifter from moving.

BACKGROUND

The statements in this section merely provide background information related to the present disclosure and may or may not constitute prior art.

A typical manual transmission in a motor vehicle is activated by a shifter. The shifter allows an operator of the motor vehicle to manually engage the manual transmission in order to select from a plurality of forward, neutral, and reverse gear ratios. The shifter is typically coupled to the manual transmission through shift cables. During adjustment of the shift cables, any inadvertent bumping or movement of the shifter in a forward direction relative to the motor vehicle, a rearward direction relative to the motor vehicle, or a left/right (e.g. cross-car) direction relative to the motor vehicle may lead to misalignment of the shifter. Misalignment of the shifter may lead to undesirable shifting characteristics of the motor vehicle after assembly.

Accordingly, there is a need in the art for a device for preventing a shifter form moving during assembly of a motor vehicle that is reusable, effective, and easy to attach and detach.

SUMMARY

The present disclosure provides an example of a tool adapted to prevent a shifter shaft from moving relative to a shifter housing. The shifter shaft is operable to change a gear speed in a manual transmission in a motor vehicle. The tool includes an elongated member that includes a first side, a second side substantially opposite the first side, and a third side disposed between the first and second sides, wherein the elongated member is disposed at least partially parallel to the shifter shaft and is adapted to be secured to the shifter housing. A first side member is disposed on the first side of the elongated member, a second side member is disposed on to the second side of the elongated member, and a collar is disposed on the third side of the elongated member, wherein the collar is adapted to secure to the shifter shaft. The first side member and second side member prevent the shifter shaft from moving in a first direction relative to the shifter housing and the elongated member prevents the shifter shaft from moving in a second direction relative to the shifter housing.

In one example of the tool of the present disclosure, the elongated member includes a first end and a second end located substantially opposite the first end, and wherein the collar is attached to the elongated member proximate the first end.

In another example of the tool of the present disclosure, the second end is adapted to be secured to the shifter housing.

In yet another example of the tool of the present disclosure, the second end is adapted to fit within a groove disposed in the shifter housing and wherein the second end is tapered.

In yet another example of the tool of the present disclosure, the first side member and the second side member are disposed approximately equidistant from the first end and the second end of the elongated member.

In yet another example of the tool of the present disclosure, the elongated member further includes a fourth side located substantially opposite the third side, and the tool further comprises a gripping feature attached to the fourth side.

In yet another example of the tool of the present disclosure, the gripping feature is disposed opposite the collar.

In yet another example of the tool of the present disclosure, the gripping feature is a knob that is disposed perpendicular to the fourth side.

In yet another example of the tool of the present disclosure, the collar includes an opening and is operable to flex to allow the shifter shaft to pass therethrough when the tool is attached and removed from the shifter.

In yet another example of the tool of the present disclosure, the first side member is disposed between the shifter shaft and the shifter housing and second side member is disposed between the shifter shaft and the shifter housing.

In yet another example of the tool of the present disclosure, the first side member includes a first end and a second end located opposite the first end, and wherein the first side member is attached to the elongated member at the first end.

In yet another example of the tool of the present disclosure, the second end of the first side member includes at least one rounded portion and at least one flat portion.

In yet another example of the tool of the present disclosure, the second side member includes a first end and a second end located opposite the first end, and wherein the second side member is attached to the elongated member at the first end.

In yet another example of the tool of the present disclosure, the second end of the second side member includes at least one rounded portion and at least one flat portion.

In yet another example of the tool of the present disclosure, the elongated member includes a first portion and a second portion, wherein the first portion is located on a plane that is offset from the second portion.

The present disclosure also provides a method for preventing a shifter shaft from moving relative to a shifter housing in a manual transmission, the method including the steps of moving a reverse collar disposed around the shifter shaft to a first position, providing a tool having a elongated member, a collar attached to the elongated member, and at least one side member attached to the elongated member, inserting the elongated member into a groove in the shifter housing, pivoting the tool towards the shifter shaft until the collar attaches to the shifter shaft and the at least one side member is disposed between the shifter shaft and the shifter housing, moving the reverse collar to a second position, wherein the reverse collar abuts the collar of the tool when in the second position, and adjusting a shift cable connected to the shifter shaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
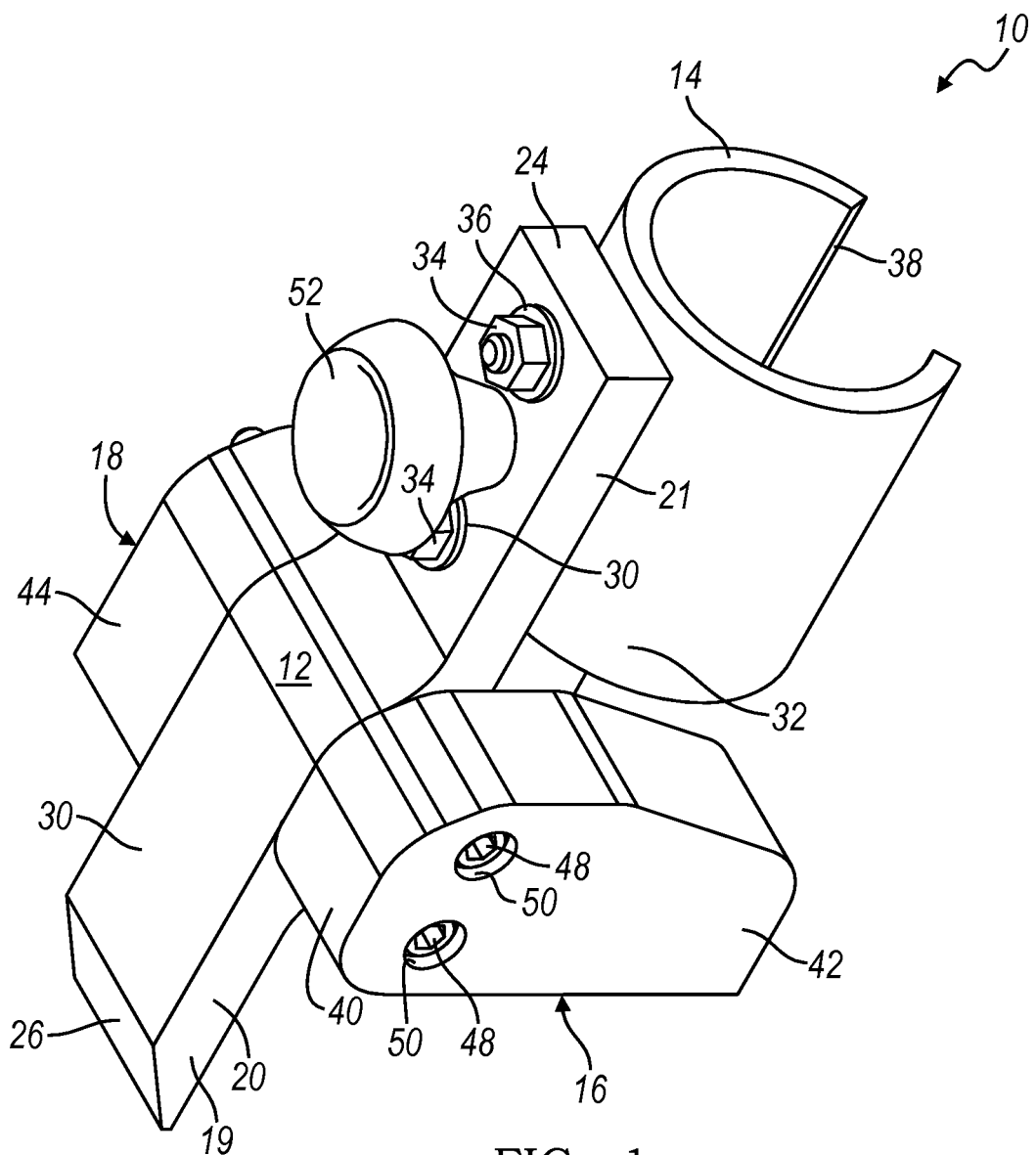
FIG. 1 is an isometric front view of an example of a tool according to the principles of the present disclosure.
Figure 2:
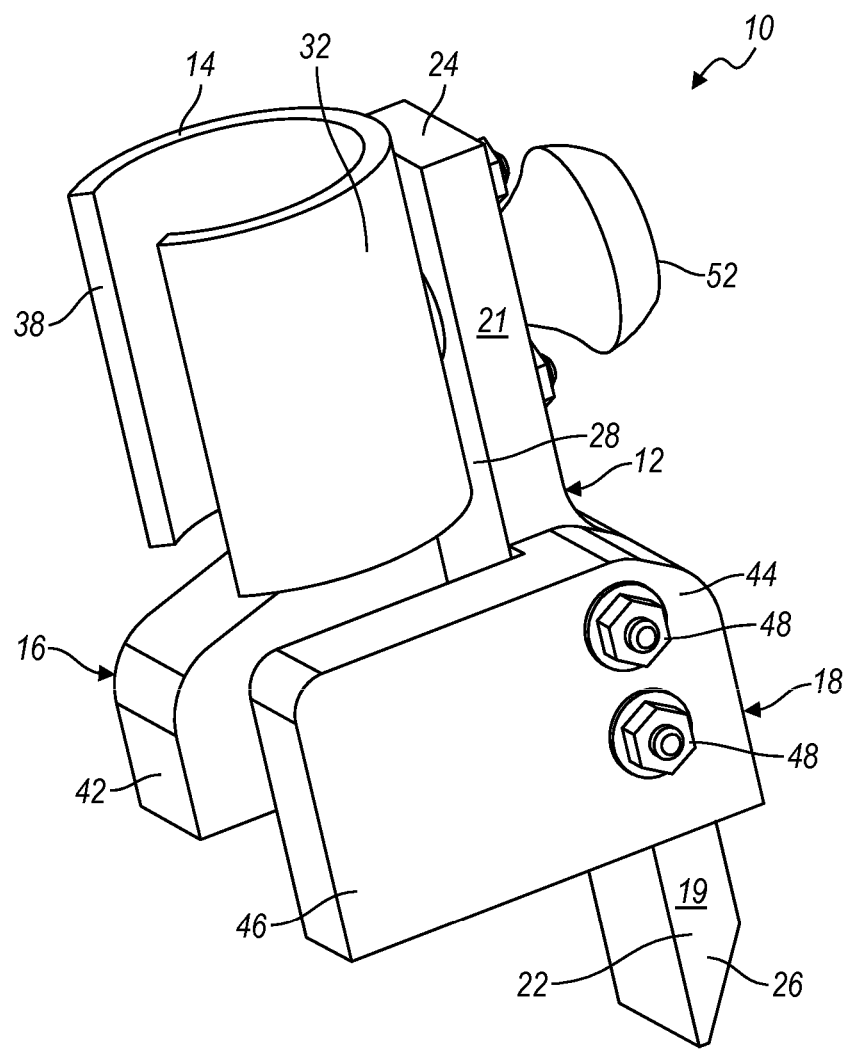
FIG. 2 is an isometric back view of an example of a tool according to the principles of the present disclosure
Figure 3:
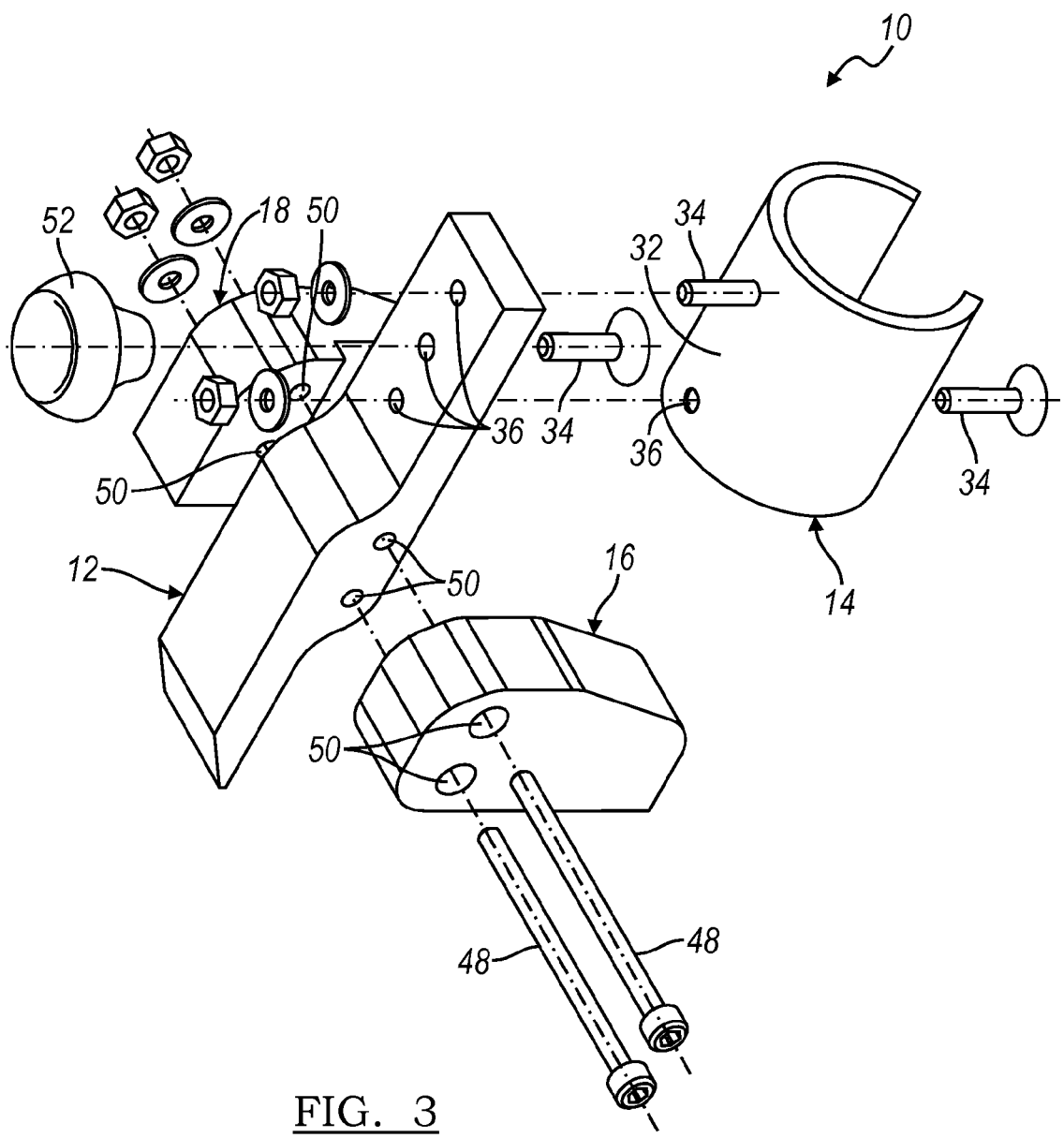
FIG. 3 is an exploded isometric view of an example of a tool according to the principles of the present disclosure.

With reference to FIGS. 1 and 2, an example of a tool according to the principles of the present disclosure is generally indicated by reference number 10. The tool 10 generally includes an elongated member or first member 12, a collar 14, a first side member 16, and a second side member 18. The elongated member 12 is generally an elongated "S" shape, though the elongated member 12 may have other shapes without departing from the scope of the present disclosure. In the example provided, the elongated member 12 includes a first portion 19 and a second portion 21. The first portion 19 is disposed on a plane that is offset from the second portion 21. The elongated member 12 also includes a first side 20, a second side 22 located substantially opposite the first side 20, a first end 24, and a second end 26 located substantially opposite the first end 26. The second end 26 is preferably tapered to assist the tool 10 in being inserted into a shifter housing, as will be described in greater detail below. The elongated member 12 also includes a third side 28 that is disposed between the first and second sides 20 and 22 and between the first and second ends 24 and 26 and a fourth side 30 located substantially opposite the third side 28 and disposed between the first and second sides 20 and 22 and between the first and second ends 24 and 26.

The collar 14 is sized to releasably attach to a shifter shaft in a shifter, as will be described in greater detail below. In the example provided, the collar 14 is substantially "C" shaped. However, it should be appreciated that the collar 14 may have other shapes without departing from the scope of the present disclosure. The collar 14 is attached to the elongated member 12 at a base portion 32. The collar 14 is preferably attached to the third side 28 of the elongated member 12 proximate the first end 24 of the elongated member 12. In the example provided, a plurality of fasteners 34, such as bolts, extend through aligned bolt holes 36 located in the elongated member 12 and the collar 14 to secure the collar 14 to the elongated member 12. However, it should be appreciated that other ways of securing the collar 14 to the elongated member 12 may be employed without departing from the scope of the present disclosure. The collar 14 defines an opening 38 disposed opposite the base portion 32. The opening 38 extends along an entire side of the collar 14. The opening 38 is sized to have a dimension that is less than a diameter of a shifter shaft in order to grip the shifter shaft. However, the collar 14 is operable to flex to widen the opening 38 to allow the shifter shaft to be placed within and removed from the collar 14.

The first side member 16 prevents a shifter shaft from moving in a cross-car direction, as will be described in greater detail below. The first side member 16 generally includes a first end 40 and a second end 42 located opposite the first end 40. The first end 40 of the first side member 16 is attached to the first side 20 of the elongated member 12. The first side member 16 extends substantially perpendicular to the third and fourth sides 28 and 30 of the elongated member 12 and the second end 42 of the first side member 16 is disposed closer to the third side 28 of the elongated member 12 than to the fourth side 30 of the elongated member 12. In the example provided, the second end 42 has a flat portion and a rounded portion, though other shapes may be employed without departing from the scope of the present disclosure.

The second side member 18 also prevents a shifter shaft from moving in a cross-car direction, as will be described in greater detail below. The second side member 18 generally includes a first end 44 and a second end 46 located opposite the first end 44. The first end 44 of the second side member 18 is attached to the second side 22 of the elongated member 12. The second side member 18 extends substantially perpendicular to the third and fourth sides 28 and 30 of the elongated member 12 and the second end 46 of the second side member 18 is disposed closer to the third side 28 of the elongated member 12 than to the fourth side 30 of the elongated member 12. In the example provided, the second end 46 has a flat portion and a rounded portion, though other shapes may be employed without departing from the scope of the present disclosure.

Both the first side member 16 and the second side member 18 are preferably attached to the elongated member 12 at approximately a midway point between the first end 24 of the elongated member 12 and the second end 26 of the elongated member 12. However, it should be appreciated that the location of attachment of the first side member 16 and the second side member 18 may vary, though preferably the first side member 16 and the second side member 18 are disposed between the collar 14 and the second end 26 of the elongated member 12. In addition, both the first side member 16 and the second side member 18 are preferably secured to the elongated member 12 via a plurality of fasteners 48, such as bolts, that extend through a plurality of aligned bolt holes 50 disposed in the first and second side members 16 and 18 and the elongated member 12. However, it should be appreciated that various other ways of securing the first and second side members 16 and 18 to the elongated member 12 may be employed without departing from the scope of the present disclosure.

In the example provided, the tool 10 further includes a gripping feature 52. The gripping feature 52 is preferably attached to the fourth side 30 of the elongated member 12 substantially opposite the collar 14. The gripping feature 52 is operable to aid a user of the tool 10 in grasping the tool 10 during use. Accordingly, in the example provided the gripping feature 52 is a knob, however the gripping feature 52 may take various other forms, such as a handle or cord, without departing from the scope of the present disclosure.

Figure 4:
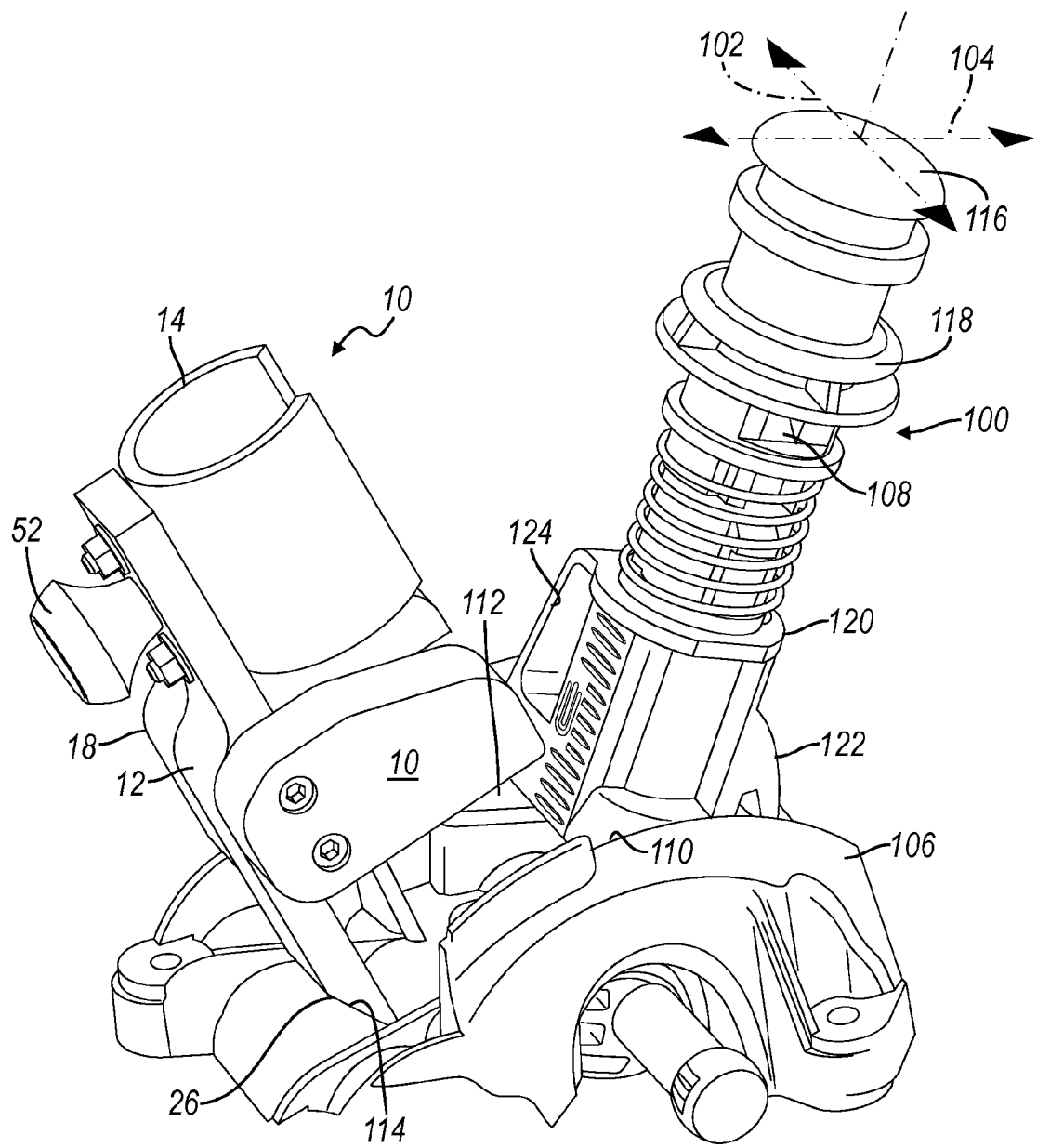
FIG. 4 is a front isometric view of an example of a tool according to the principles of the present disclosure in a first position shown with an exemplary shifter.

Turning now to FIG. 4, an exemplary shifter used in a manual transmission is indicated generally by reference number 100. It should be appreciated that the shifter 100 herein described is exemplary and other shifters having various other components and features may be used without departing from the scope of the present disclosure. The shifter 100 allows an operator of a motor vehicle to select a plurality of forward and reverse gear ratios in the transmission by manually engaging the shifter 100, as is known in the art of manual transmissions. The shifter 100 is disposed relative to a front of a motor vehicle, a back of the motor vehicle, and a left and right side of the motor vehicle. The fore/aft direction is indicated by arrow 102 and the cross-car direction (i.e. the left/right side direction) is indicated by arrow 104. The shifter 100 generally includes a shifter housing 106 and a shifter shaft 108. The shifter housing 106 is secured to the frame or other secured portion of the motor vehicle. The shifter housing 106 includes a first side wall 110 and a second side wall 112. The side walls 110 and 112 are substantially perpendicular to the cross-car direction 104 and parallel with the fore/aft direction 102. A groove 114 is disposed in the shifter housing 106 either fore or aft of the side walls 110, 112.

The shifter shaft 108 extends through the shifter housing 106 and is disposed between the first and second side walls 110, 112. The shifter shaft 108 is secured at one end thereof to a cable (not shown) that connects with the manual transmission. Typically a shift knob 116 is disposed on an opposite end of the shifter shaft 108. A spring biased reverse collar 118 is located around the shifter shaft 108 and is used to engage a reverse speed ratio in the manual transmission. Finally, a shifter locking collar 120 is secured around the shifter shaft 108. The shifter locking collar 120 includes a shifter locking tab 122 and a side slot 124.

Figure 5:
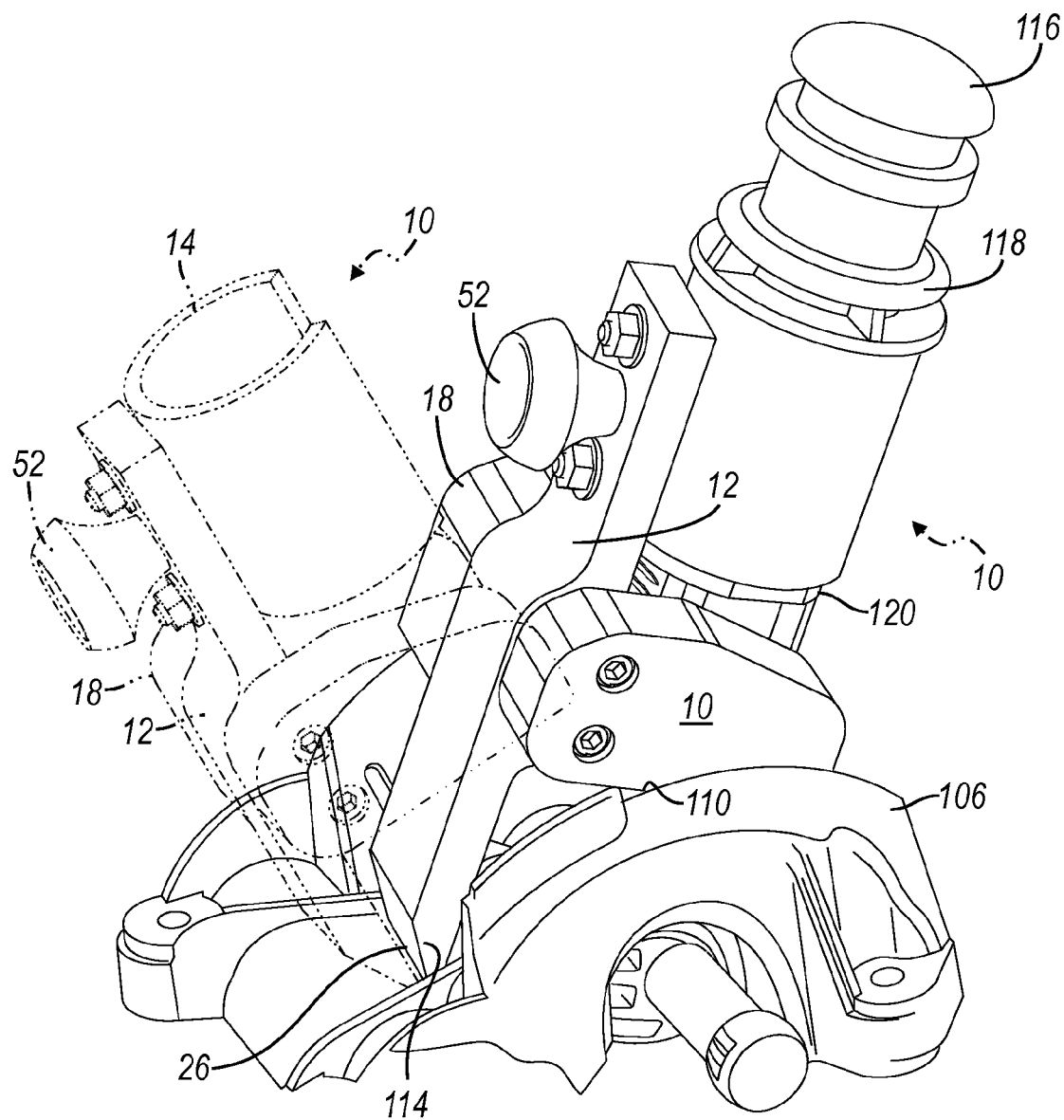
FIG. 5 is a front isometric view of an example of a tool according to the principles of the present disclosure in a second position shown with an exemplary shifter.

With combined reference to FIGS. 1-5, the operation of the tool will now be described. First, the locking tab 122 is inserted fully into the shifter housing 106. Next, the reverse collar 118 is moved to a first position. The first position corresponds to the reverse collar 118 lifted up away from the shifter housing 106. With the reverse collar 118 moved upwards, the tool 10 is inserted into the shifter housing 106. In the example provided, the second end 26 of the elongated member 12 is inserted into the groove 114 on the shifter housing 106, as shown in FIG. 4. The tool 10 is then pivoted towards the shifter shaft 108 until the collar 14 fits around the shifter shaft 108, as shown in FIG. 5. In this locked position, the first side member 16 is disposed between the shifter shaft 108 and the first side wall 110 of the shifter housing 106. The second side member 18 is disposed within the slot 124 in the locking collar 120. Once the tool 10 is in this position, the reverse collar 118 is release and abuts the top of the collar 14. The elongated member 12 prevents the shifter shaft 108 from moving in the fore/aft directions 102 while the first and second side members 16, 18 prevent the shifter shaft 108 from moving in the cross-car directions 104. With the shifter shaft 108 secure, the cable connections between the shifter 100 and the manual transmission may be adjusted. The tool 10 prevents the shifter shaft 108 from unwanted movement during inadvertent bumping or contact of the shifter shaft 108. The tool 10 is then preferably removed once all adjustments to the shifter 100 have been completed.

The description of the invention is merely exemplary in nature and variations that do not depart from the general gist of the invention are intended to be within the scope of the invention. Such variations are not to be regarded as a departure from the spirit and scope of the invention.

What is claimed is:

1. An assembly for a manual transmission in a motor vehicle, the assembly comprising:
    a shifter including a shifter housing having a first side wall and a second side wall opposite the first side wall, the shifter further including a shifter shaft disposed within the shifter housing between the first side wall and the second side wall; and
    a tool comprising:
        an elongated member that includes a first side substantially parallel to the first side wall, a second side substantially opposite the first side, and a third side disposed between the first and second sides and facing the shifter shaft, wherein the elongated member is disposed at least partially parallel to the shifter shaft;
        a first side member disposed on the first side of the elongated member between the shifter shaft and the first side wall of the shifter housing and extending toward the shifter shaft;
        a second side member disposed on the second side of the elongated member between the shifter shaft and the second side wall of the shifter housing and extending toward the shifter shaft;
        a collar disposed on the third side of the elongated member, wherein the collar includes an opening receiving the shifter shaft;
        wherein the elongated member includes a first end and a second end located substantially opposite the first end, with the collar being attached proximate the first end, and with the second end being disposed within a groove in the shifter housing;
        wherein the first side member and second side member prevent the shifter shaft from moving in a first direction perpendicular to the first and second side walls of the shifter housing, and the elongated member prevents the shifter shaft from moving in a second direction parallel to the first and second side walls of the shifter housing.

2. The assembly of claim 1 wherein the first side member and the second side member are disposed approximately equidistant from the first end and the second end of the elongated member.

3. The assembly of claim 1 wherein the elongated member further includes a fourth side located substantially opposite the third side, and the tool further comprises a gripping feature attached to the fourth side.

4. The assembly of claim 3 wherein the gripping feature is disposed opposite the collar.

5. The assembly of claim 4 wherein the gripping feature is a knob extending outwardly from the fourth side.

6. The assembly of claim 1 wherein the shifter further comprises a reverse collar disposed around the shifter shaft, wherein the collar of the tool is releasably coupled to the shifter shaft underneath the reverse collar.

7. The assembly of claim 1 wherein the first direction is a cross-car direction relative to the motor vehicle and the second direction is either a forward direction or a rearward direction relative to the motor vehicle.

8. The assembly of claim 1 wherein the second end is tapered.

9. The assembly of claim 1 wherein the first side member includes a first end and a second end located opposite the first end, and wherein the first side member is attached to the elongated member at the first end.

10. The assembly of claim 9 wherein the second end of the first side member includes a rounded portion and a flat portion.

11. The assembly of claim 1 wherein the second side member includes a first end and a second end located opposite the first end, and wherein the second side member is attached to the elongated member at the first end.

12. The assembly of claim 11 wherein the second end of the second side member includes a rounded portion and a flat portion.

13. The assembly of claim 1 wherein the elongated member includes a first portion and a second portion, wherein the first portion is located on a plane that is offset from the second portion.

* * * * *